Sept. 5, 1950   E. G. POPHAL   2,521,091
TEMPERATURE CONTROLLED SEAT STRUCTURE
Filed May 6, 1947
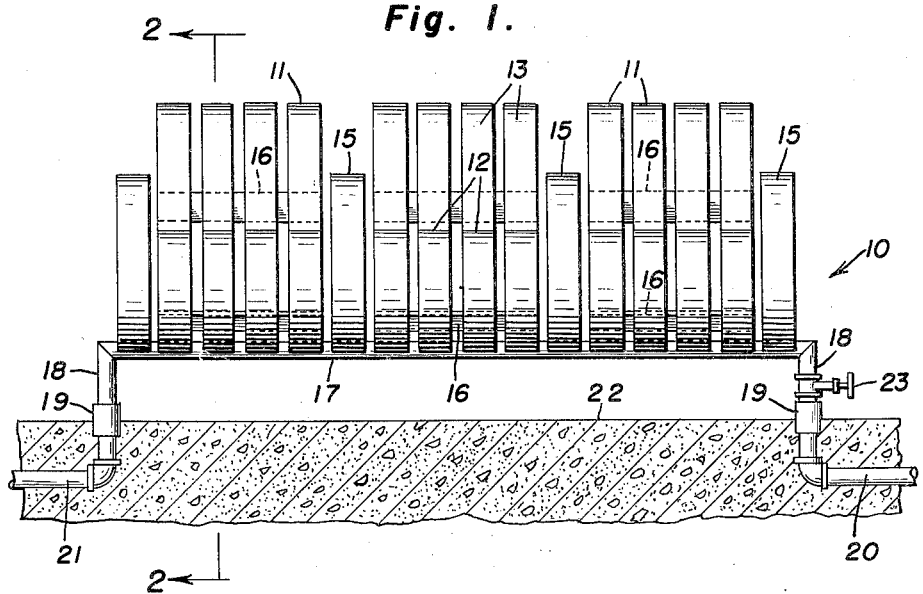
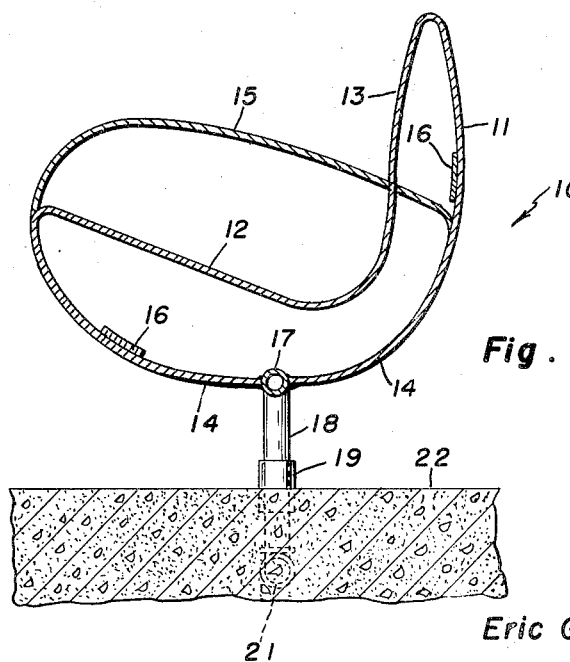
Inventor
Eric G. Pophal
By Clarence A. O'Brien
and Harvey B. Jacobson
Attorneys _Patented Sept. 5, 1950_                                    2,521,091

UNITED STATES PATENT OFFICE 2,521,091

TEMPERATURE CONTROLLED SEAT STRUCTURE

Eric G. Pophal, St. Pauls, N. C.

Application May 6, 1947, Serial No. 746,418

4 Claims. (Cl. 155—1)

This invention relates to new and useful improvements and structural refinements in seats, more specifically, seats such as are commonly employed in auditoriums, stadiums, or the like, and the principal object of the invention is to provide a seat structure of the character herein described which is controlled as to temperature, either hot or cold, so as to assure comfort of the person occupying the same, this feature, particularly in outdoor installations, possessing heretofore unknown advantages.

A further object of the invention is to provide a seat structure which eliminates the use of conventional upholstery, which is pleasing in appearance, and which may be easily kept clean.

Another object of the invention is to provide a seat structure which, being silent in use, eliminates the conventionally experienced annoyance of "squeaking" and which, as a whole, may be readily installed or removed.

An additional object of the invention is to provide a seat structure which will readily lend itself to economical manufacture in large quantities, and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a front elevational view of the invention, and

Figure 2 is a cross sectional view, taken substantially in the plane of the line 2—2 in Figure 1.

Like characters of reference are used to designate like parts in the specification and throughout the several views.

Referring now to the accompanying drawings in detail, the invention consists of a seat structure designated generally by the reference character 10, the same embodying in its construction a plurality of endless, metallic straps 11, configurated substantially as shown and forming, as a unit, a seat platform 12, a lazyback 13, and a supporting cradle 14.

Further straps, similar to the straps 11, provide conveniently disposed arm rests 15, and it will be noted that the cradle portion 14 is reinforced by one or more transversely extending tie strips 16.

The straps forming the arm rests 15 as well as the straps 11 are secured in a spaced parallel relation to a metallic conduit or pipe 17, the latter having downturned end portions as indicated at 18, whereby it may be connected by means of the couplings 19 to suitable feed and return pipes 20, 21 respectively. The pipes 20, 21 may be embedded in the ground, or as shown in the drawings, in a concrete floor 22, and a shut-off valve 23 may be provided in one of the conduit portions 18, preferably adjacent the pipe 20, as will be clearly apparent from the accompanying drawings.

It should be understood that the seats may be formed individually, but the invention is primarily intended to embody a structure consisting of a row of seats, substantially as shown. The straps forming the arm rests 15 as well as the straps 11 may be secured to the conduit 17 in any desired manner, preferably by welding, while the tie strips 16 are similarly secured to the straps 11, so that integral formation, as it were, of the seat structure is achieved.

When the invention is placed in use, a suitable temperature controlling agent, such as hot water or steam, is passed through the conduit 17 and it will be found that the various strips forming the seats will provide what may be called paths of thermal conductivity for the dissipation of temperature of the agent flowing through the conduit. In other words, if hot water or steam is passed through the conduit, the heat thereof will be dissipated throughout the seat structure, in which manner the latter will become heated or warmed to a suitable degree, so as to assure comfort to the person occupying the same. On the other hand, if cold water is passed through the conduit, a cooling effect of the seat structure will result, in a similar manner.

Needless to say, the amount of heat or cold "passed" into the seat may be conveniently controlled by simple manipulation of the valve 23.

It should be also added that when, in temporary installations, the seats are removed, the disconnection of the conduit 17 is accomplished by removing the couplings 19 and applying suitable caps to the free ends of the pipes 20, 21. These caps (not shown) may be disposed below the floor level, so that the flat continuity of the floor will be uninterrupted and in immediate readiness for other use.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a temperature-controlled seat structure, the combination of a metallic conduit constituting a substantially horizontal base member and carrying a fluid temperature controlling agent therein, and a continuous metallic strap secured to said member and extending forwardly and upwardly and then being angulated rearwardly to overlie in spaced relation its forwardly and upwardly extending portion, the rearwardly angulated portion of the strap constituting a seat platform, a continuation of the rear end of said platform extending upwardly to provide a back rest, and a continuation of the upper end of the back rest extending downwardly in spaced relation behind said back rest and being secured to said base member.

2. The device as defined in claim 1 wherein said forwardly and upwardly extending portion and said downwardly extending portion of said strap constitute sole means for supporting said platform and said back rest.

3. The device as defined in claim 1 together with a continuous metallic strip secured to said base member in spaced parallel relation to said strap, said strip extending forwardly and upwardly from the base member above the level of said platform and then being angulated rearwardly to overlie in spaced relation its forwardly and upwardly extending portion, the rearwardly angulated portion of said strip constituting an arm rest disposed above and at one side of said seat platform, and a continuation of the rear end of said arm rest extending downwardly and being secured to said base member.

4. The device as defined in claim 3 wherein said forwardly and upwardly extending portion and said downwardly extending portion of said strip constitute sole means for supporting said arm rest.

ERIC G. POPHAL.

REFERENCES CITED

The following references are of record in the file of this patent:

FOREIGN PATENTS

| Number | Country | Date |
|---|---|---|
| 138,283 | Switzerland | May 1, 1930 |
| 183,144 | Switzerland | June 16, 1936 |
| 406,596 | Great Britain | Mar. 1, 1934 |